United States Patent
Gilbert

[15] 3,695,805
[45] *Oct. 3, 1972

[54] FORMING PLUG FOR BLOW MOLDING ORIENTED ARTICLES

[72] Inventor: Dixie E. Gilbert, Bartlesville, Okla.
[73] Assignee: Phillips Petroleum Company
[ * ] Notice: The portion of the term of this patent subsequent to March 14, 1989, has been disclaimed.
[22] Filed: Feb. 17, 1970
[21] Appl. No.: 12,023

Related U.S. Application Data

[63] Continuation-in-part of Ser. No. 880,326, Nov. 26, 1969, Pat. No. 3,649,150.

[52] U.S. Cl. ............425/393, 264/98, 264/338, 425/326
[51] Int. Cl. ...................B29c 1/04, B29c 17/07
[58] Field of Search.......18/5 BM, 5 BA, 5 BB, 5 BE, 18/5 BN; 264/94, 97, 98, 99, 338; 425/326, 387, 388, 392, 393, 403

[56] References Cited

UNITED STATES PATENTS

| 3,311,950 | 4/1967 | Strauss | 264/98 X |
| 3,507,005 | 4/1970 | Wiley et al. | 264/94 X |

Primary Examiner—Robert F. White
Assistant Examiner—J. H. Silbaugh
Attorney—Young & Quigg

[57] ABSTRACT

A first end portion of a tubular parison free form which has been heated to orientation temperature is expanded out into conformity with neck or thread forming jaws by inserting into one end of said parison a first end portion of a plug, closing the jaws over the first end portions of the parison and the plug, and thereafter forcing the first end portion and other portions of the plug into the parison.

6 Claims, 4 Drawing Figures

PATENTED OCT 3 1972 3,695,805
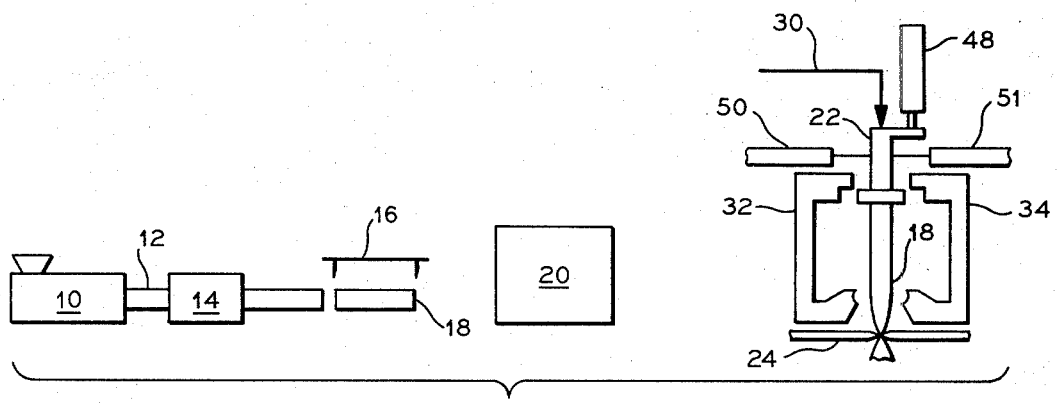
FIG. 1
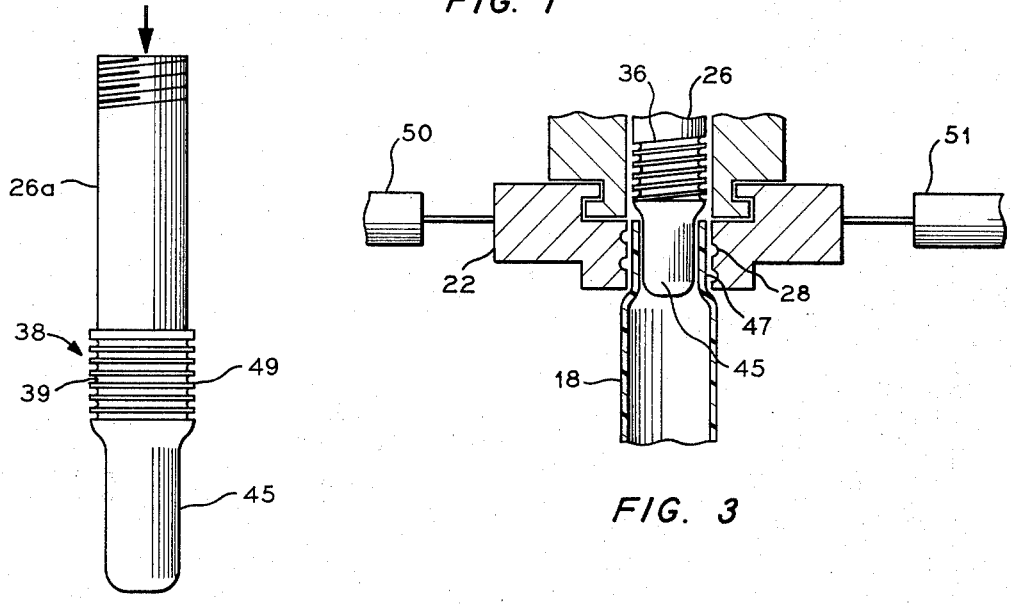
FIG. 2
FIG. 3
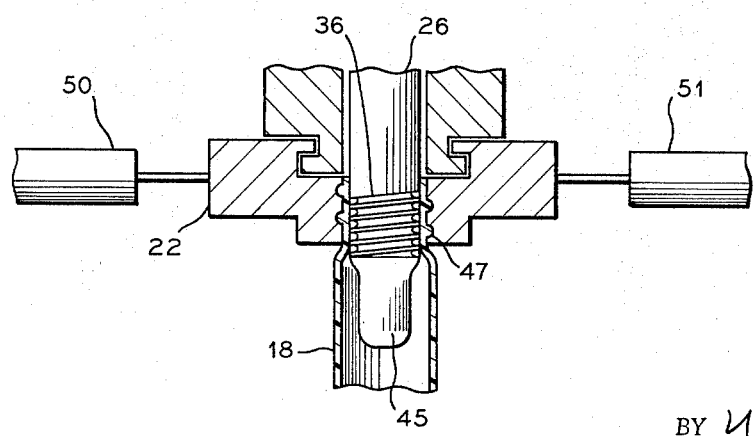
FIG. 4
INVENTOR.
D. E. GILBERT
BY Young & Quigg
ATTORNEYS

FORMING PLUG FOR BLOW MOLDING ORIENTED ARTICLES

This application is a continuation-in-part of application, Ser. No. 880,326, filed Nov. 26, 1969, now U.S. Pat. No. 3,649,150, of same inventor, and entitled "-Stellite Neck Forming Plug for Blow Molding Oriented Articles."

This invention relates to forming hollow articles by blow molding a thermoplastic parison at the orientation temperature of said thermoplastic.

In another aspect, this invention relates to apparatus and method for forming the neck or upper portion of a vessel such as a bottle for example.

Patents in the blow molding art go back over 100 years; however, it has only been in the last dozen years or so that this technique has achieved significant commercial success. Very recently, techniques have been developed for forming biaxially oriented, hollow articles utilizing a technique wherein a parison is fabricated at orientation temperature. Such techniques are disclosed in Wiley, U.S. Pat. No. 3,288,317, and Turner et al., U.S. Pat. No. 3,390,426, for instance. The techniques disclosed in said Wiley and Turner et al patents make possible the production of articles having very desirable properties, which properties cannot be obtained in conventional processes. However, by virtue of the fact that the parison is at orientation temperature during the fabrication process, many manipulative operations which are easily carried out on a thoroughly molten parison present special problems utilizing this technique.

One particularly difficult problem is getting a good finish on the neck and/or thread area. A tapered plug can be inserted into the interior of the parison to force it out into conformity with the neck-forming jaws which may include grooves for forming threads and the like. However, because the parison is at orientation temperature, which is well below the point at which it is molten, a substantial amount of force is required to accomplish this. It has been found that with plugs made of metal, such as steel, the parison is pushed out of the molding jaws, rather than being expanded into conformity with the thread-forming zone. Various plastic materials known to have good high temperature properties and low coefficient of friction have been tried, but they tend to wear out and/or develop a buildup of deposits which causes sticking. It has also been found that the configuration of the plug, the dimensions of the plug relative to the parison, the wall thickness of the parison, and the percentage of change of the inside diameter of the parison from the original size to the squeezed-down neck size of the resultant vessel are important for forming thick-walled, small-necked vessels having flash-free, uniform necks.

It is therefore an object of this invention to provide a forming plug and an improved method for blow molding molecularly oriented articles. Another object of this invention is to provide apparatus and method for forming vessels having an improved neck portion. Yet another object of this invention is to provide apparatus and method for forming the neck portion of vessels having relatively thick walls and relatively small neck portions. Other aspects, objects, and advantages of the present invention will become apparent from a study of the disclosure, the appended claims, and the drawings.

In the drawings,

FIG. 1 is a schematic representation of a molding operation adapted to utilize the instant invention;

FIG. 2 is a side elevation of the forming plug of this invention;

FIG. 3 is a diagrammatic view showing the parison and crimping jaws at the first position of the plug; and FIG. 4 is a diagrammatic view showing the parison, the plug and the jaws at the second position of the plug.

This invention is applicable for the formation of any biaxially oriented article having a neck and/or thread area which requires reasonably precise detail. This invention is particularly applicable for the formation of articles having relatively thick walls and relatively small neck portions.

The invention is applicable for the production of these articles from any oriented thermoplastic resin. Exemplary resins are polyolefins, poly(vinylchloride), acrylonitrile/butadiene-styrene polymers, styrene-butadiene containing copolymers, vinylidene chloride polymers and copolymers, polyamide, polystyrene, and the like. Preferred resins include crystalline polymers such as polymers of at least one mono-1-olefin having two to eight carbon atoms per molecule, more particularly polymers and copolymers of ethylene, propylene, and 1-butene, with polypropylene being especially preferred.

In the preferred method for forming the article, the thermoplastic is extruded or molded into parison forms and cooled to solidify same. The parisons are then heated to orientation temperature which, in the case of olefin polymers, is generally about 1–50, preferably 5°–25° F., below the crystalline melting temperature. The crystalline melting temperature can be determined by placing a small sample of the material to be tested on a heating stage of a polarizing microscope and recording the crystalline melting point as that temperature at which the last birefringence disappears upon slow heating. The parison preforms can be heated to this orientation temperature in an air oven, in a liquid bath, in a heating block, or by subjecting them to radiation heat or any other suitable means. While the stretching, insertion of the plug, closing of the jaws on the plug, further insertion of the plug, and expansion into conformity with the mold is generally carried out at ambient temperature, the sequence of steps is sufficiently rapid that the polymer remains at orientation temperature throughout the operation. Preferably at least the surface of the portion of the plug contacting the parison is made of an alloy having a composition comprising the following: 40–80 percent cobalt; 20–35 percent chromium; 0.75–2.5 carbon; 0–25 percent tungsten; 0–5 percent nickel; 0–5 percent iron; 0–3 percent manganese; 0–3 percent silicon; and 0–2 percent molybdenum, all precentages being based on weight. Such materials are available from Haynes Stellite Company under the trade name Stellite. The plug can either be solid stellite or stellite-coated steel or the like. The plug can also have passages formed therethrough for the flow of fluid therethrough or installation of a heater therein for maintaining the temperature of the plug at a preselected temperature.

The plug of this invention has a first end portion of reduced diameter and a second portion of larger diameter than the first end portion. The portion of the plug contacting the parison is preferably machined to give a surface smoothness of 1 to 125 micro inches, root mean square (RMS), preferably 3 to 10 RMS. Thereafter generally annular serrations are formed around this portion of the plug. These generally annular serrations can either be in the form of serrations of unconnected grooves or they can be in the form of threads. Threads are preferred because of the greater simplicity in the machining operations. Preferably, the threads have a depth of 1–4 mils, more preferably 1–2 mils, and a lead of 2–15, preferably 6–12 mils. However, it is within the scope of the invention to make the plug from other materials such as tungsten carbide, ceramic, and high melting plastics, etc.

Now referring to the FIGURES, there is shown in FIG. 1 an extrusion means 10 for forming a tubular extrudate 12. The tubular extrudate passes through vacuum cooling and sizing chamber 14 and thence to cutter 16 where it is severed into individual parison preforms 18. A parison preform 18 passes through an air oven 20 where it is heated to orientation temperature. Thereafter, the parison preform 18 is transferred by means not shown to forming jaws 22 (better seen in FIGS. 3 and 4). At the jaws 22 a first end portion 45 of the plug 26 is inserted into the first end portion 47 of the parison 18 and the jaws 22 are closed by jaw cylinders 50, 51 for example about the first end portion 45 of the plug 26 and the intervening first end portion 47 of the parison 18. Gripping fingers 24 thereafter grasp the parison 18 and the parison is axially stretched by relative movement between the jaws 22 and the gripping fingers 24. It should be understood that the parison can be stretched by other means. Either before, during, or after this stretching operation, plug 26 descends to a second position, shown in FIG. 4, to force the upper end of parison 18 out into conformity with, for example, thread forming contours 28 of the jaws 22. The plug is attached to a cylinder means 48 for axial movement of the plug to effect insertion of the first end portion 45 and the second portion 49 of the plug 26 into the parison 18. Thereafter, fluid pressure is introduced via line 30 to expand said parison 18 out into conformity with the molding zone formed by mold halves 32 and 34 shown in FIG. 1. Plug 26 has spiral threads 36, for example, in the portion which contacts parison 18.

Referring to FIG. 2, there is shown a plug 26a identical to plug 26 except that in place of threads, cylindrical section 38 has a series of annular serrations 39. The plugs 26 and 26a each have a first end portion 45 and a larger second end portion 49. In all figures, the size of the serrations is exaggerated since, as noted above, the actual depth is only about 1–4 mils. The first and second portions 45, 49 of the plug which comes into contact with the parison can either be cylindrical so as to give an interior finish to the neck of the bottle which is of the same diameter from top to bottom to thus facilitate the use in conventional filling machinery, or it can have a slight taper. In the instances where it is tapered, it will generally have a tapering in the order of 2–10, preferably about 5 mils per inch.

FIG. 3 shows the jaws closing over the first end portion 47 of the parison 18 and the first end portion 45 of the plug 26 thereby initially forming the upper or first end portion 47 of the parison 18 at the first position of the plug 26. FIG. 4 shows the plug 26 at its second position wherein the first and second portions 45, 49 of the plug 26 have been inserted by the cylinder means 48 into the parison 18. Movement of the plug to the second position, by the cylinder 48 for example, as shown in FIG. 4 causes the material of the parison to flow and form the upper portion of the article.

It has been found that the outside diameter of the first and second end portions 45, 49 of the plug 26 are critical. If the outer diameters of the first or second end portions 45, 49 of the plug 26 are too small, there is not sufficient material between plug 26 and the jaws to finish the upper portion of the article and if either of said diameters are too large relative to the wall thickness of the parison 18 and the inside diameter of the jaws, the material is forced outwardly thereby forming flash which must subsequently be trimmed to provide an acceptable article. It has been found that the outside diameter of the plug can be effectively sized by providing the second portion of the plug with dimensions such that the difference between the outside diameter of the second portion of the plug and the inside diameter of the jaws in the closed position is twice as large as the desired wall thickness of the formed neck of the article. Having selected the preferred diameter of the second portion of the plug, the dimensions of the first portions of the plug for correct necking of the material can be found by applying the following equation:

$$\text{Plug first portion OD (inches)} = \sqrt{\frac{(.785)\left(\begin{array}{c}\text{reduced}\\ \text{parison OD}\\ \text{(inches)}\end{array}\right)^2 - \left(\begin{array}{c}\text{annular cross sectional}\\ \text{area of original parison}\\ \text{(inches}^2\text{)}\end{array}\right)}{.785}} - .023$$

The reduced parison OD is the outside diameter of the first end portion of the parison after the jaws have been closed over said first end portion. This equation has been found to be particularly accurate for sizing the plug when the percentage change in the inner diameter of the original parison to the squeezed-down parison amounts to about 37 percent or less. By utilizing plugs that are sized in this manner, the first portion of the parison will be squeezed down against the plug to provide just the right volume of plastic to form a good, flash-free neck.

Other modifications and alterations of this invention will become apparent to those skilled in the art from the foregoing discussion, and accompanying drawing, and it is to be understood that this invention is not to be unduly limited thereto.

What is claimed is:
1. An apparatus for forming a first portion of a blow-molded, oriented parison, comprising:
a plug having a first end portion and being movable between a first position at which the first end portion is inserted within the first end portion of the parison and a second position at which the first and a larger second portion of the plug are positioned within the first end portion of the parison, said first and second portions of the plug having a cylindrical configuration with the first portion of the plug having an outside dimension related to a preselected outside dimension of the second portion of the plug by the equation

$$\text{Plug first portion OD (inches)} = \sqrt{\frac{(.785)(A)^2 - (B)}{.785}} - .023$$

where: A = OD of that area encompassed by jaw pair at the second position (inches)

B = annular cross-sectional area of preselected parison to be formed and the difference between the outside diameter of the second portion of the plug and the inside diameter of the jaws at the second position is about twice as large as a preselected wall thickness of the first portion of the parison in the formed condition;

a pair of jaws movable from a first position at which each jaw is spaced from a first end portion of the parison at the first position of the plug and a second position at which the jaws are forcefully urging the first end portion of the parison against the first end portion of the plug about the circumference of said plug portion in the first position of said plug for initially forming the therebetween portion of the parison and against the second end portion of the plug in the second position of said plug;

means for moving the jaws between the first and the second positions; and means for moving the plug between the first and second positions.

2. An apparatus, as set forth in claim 1, wherein at least the outer surface of the plug is made of an alloy comprising 40–80 percent cobalt, 20–35 percent chromium, 0.75–2.5 percent carbon, 0–25 percent tungsten, 0–5 percent nickel, 0–5 percent iron, 0–3 percent manganese, 0–3 percent silicon, and 0–2 percent molybdenum.

3. An apparatus, as set forth in claim 1, wherein the first and second portions of the plug have a cylindrical configuration.

4. An apparatus, as set forth in claim 1, wherein the first and second portions of the plug each have a relatively small taper.

5. An apparatus, as set forth in claim 1, wherein the means for moving the jaws are hydraulic cylinders.

6. An apparatus for forming a first portion of a blow-molded oriented parison comprising:

a plug having a first end portion and being movable between a first position at which the first end portion is inserted within the first end portion of the parison and a second position at which the first and a larger second portion of the plug are positioned within the first end portion of the parison, said first and second portions of the plug having a cylindrical configuration with the first portion of the plug having an outside dimension related to a preselected outside dimension of the second portion of the plug by the equation $$\text{Plug first portion OD (inches)} = \sqrt{\frac{(.785)(A)^2 - (B)}{.785}} - .023$$

where: A = OD of that area encompassed by jaw pair at the second position (inches)

B = annular cross-sectional area of preselected parison to be formed and the difference between the outside diameter of the second portion of the plug and the inside diameter of the jaws at the second position is about twice as large as a preselected wall thickness of the first portion of the parison in the formed condition;

and with at least the outer surface of said plug being made of an alloy comprising 40–80 percent cobalt, 20–35 percent chromium, 0.75–2.5 percent carbon, 0–25 percent tungsten, 0–5 percent nickel, 0–5 percent iron, 0–3 percent manganese 0–3 percent silicon, and 0–2 percent molybdenum;

a pair of jaws movable from a first position at which each jaw is spaced from a first end portion of the parison at the first position of the plug and a second position at which the jaws are forcefully urging the first end portion of the parison against the first end portion of the plug about the circumference of said plug portion in the first position of said plug for initially forming the therebetween portion of the parison and against the second end portion of the plug in the second position of said plug;

means for moving the jaws between the first and the second positions; and means for moving the plug between the first and second positions.

* * * * *